(12) United States Patent
Landau et al.

(10) Patent No.: US 12,488,540 B2
(45) Date of Patent: Dec. 2, 2025

(54) OPTICAL MODULE WITH ACTIVE MICROLENS ARRAY CAPABLE OF SYNCHRONIZING WITH SEE-THROUGH DISPLAY TO PROVIDE MULTIPLE MODES OF FUNCTIONALITY

(71) Applicant: NewSight Reality, Inc., Roanoke, VA (US)

(72) Inventors: Igor Landau, Boulder, CO (US); Rick Morrison, Longmont, CO (US); Svetlana Samoilova, Alameda, CA (US)

(73) Assignee: NewSight Reality, Inc., Ponte Vedra, FL (US)

( * ) Notice: Subject to any disclaimer, the term of this patent is extended or adjusted under 35 U.S.C. 154(b) by 905 days.

(21) Appl. No.: 17/236,949

(22) Filed: Apr. 21, 2021

(65) Prior Publication Data
US 2022/0343606 A1    Oct. 27, 2022

(51) Int. Cl.
| | | |
|---|---|---|
| *G06T 19/00* | (2011.01) |
| *G02B 3/02* | (2006.01) |
| *G02B 27/01* | (2006.01) |
| *G02F 1/1337* | (2006.01) |
| *G02F 1/31* | (2006.01) |
| *G06F 3/01* | (2006.01) |
| *G06T 13/20* | (2011.01) |

(52) U.S. Cl.
CPC .............. *G06T 19/006* (2013.01); *G02B 3/02* (2013.01); *G02B 27/0172* (2013.01); *G02F 1/133769* (2021.01); *G02F 1/31* (2013.01); *G06F 3/011* (2013.01); *G06T 13/20* (2013.01)

(58) Field of Classification Search
CPC .... G06T 19/006; G02B 3/02; G02B 27/0172; G02F 1/133769; G02F 1/31
See application file for complete search history.

(56) References Cited

U.S. PATENT DOCUMENTS

| | | |
|---|---|---|
| 7,077,523 B2 | 7/2006 | Seo et al. |
| 11,119,353 B2 | 9/2021 | Blum |
| 2013/0113973 A1 | 5/2013 | Miao |
| 2014/0168783 A1 | 6/2014 | Luebke et al. |
| 2016/0216515 A1 | 7/2016 | Bouchier et al. |
| 2018/0199028 A1 | 7/2018 | Ratcliff et al. |
| 2020/0201044 A1 | 6/2020 | Singh et al. |
| 2021/0014473 A1 | 1/2021 | Hua et al. |

OTHER PUBLICATIONS

Application No. PCT/US 22/24205, International Search Report and Written Opinion dated Sep. 23, 2022.
(Continued)

*Primary Examiner* — Joseph L Williams
(74) *Attorney, Agent, or Firm* — Woods Rogers Vandeventer Black PLC; Nathan A. Evans

(57) ABSTRACT

A multiplexed, synchronized Active (micro) Lens(let) Array and display providing a user or manufacturer with the ability to choose different modes of functionality of a transparent optical module, such as three-dimensional virtual image generation, two-dimensional image generation, static MLA functionality, augmented, mixed, or enhanced reality, variations in brightness, and other modes.

33 Claims, 6 Drawing Sheets

(56) References Cited

OTHER PUBLICATIONS

Xia, X., et al., "Towards a Switchable AR/VR Near-eye Display with Accommodation-Vergence and Eyeglass Prescription Support," IEEE Transactions on Visualization and Computer Graphics, vol. 25, No. 11, pp. 3114-3124, Nov. 2019, doi: 10.1109/TVCG. 2019.2932238, https://ieeexplore.ieee.org/abstract/document/ 8794584.
Rankin, I., "Development of a digital colour display system for head mounted applications," Thesis submitted for the degree of Doctor of Philosophy, The University of Edinburg, 1997, https://ethos.bl.uk/ OrderDetails.do?uin=uk.bl.ethos.660931.
Kress, B., "Optical Architecture for Augmented-, Virtual-, and Mixed Reality Headsets," SPIE (2020), https://doi.org/10.1117/3. 2559304.
Kanebako, T., et al., "Time-multiplexing display module for high-density directional display," Proc. SPIE 6803, Stereoscopic Displays and Applications XIX, 68030P (Feb. 29, 2008); doi: 10.1117/ 12.767881.
Kupiec, S., et al., "Multiview multiperspective time multiplexed autostereoscopic display," Proc. SPIE 6803, Stereoscopic Displays and Applications XIX, 68030N (Feb. 29, 2008); https://doi.org/10. 1117/12.766572.
Nikolas Chronis, Gang L. Liu, Ki-Hun Jeong, and Luke P. Lee, "Tunable liquid-filled microlens array integrated with microfluidic network," Optics Express vol. 11, Issue 19, pp. 2370-2378 (2003), https://www.osapublishing.org/oe/fulltext.cfm?uri=oe-11-19-2370 &id=74372.

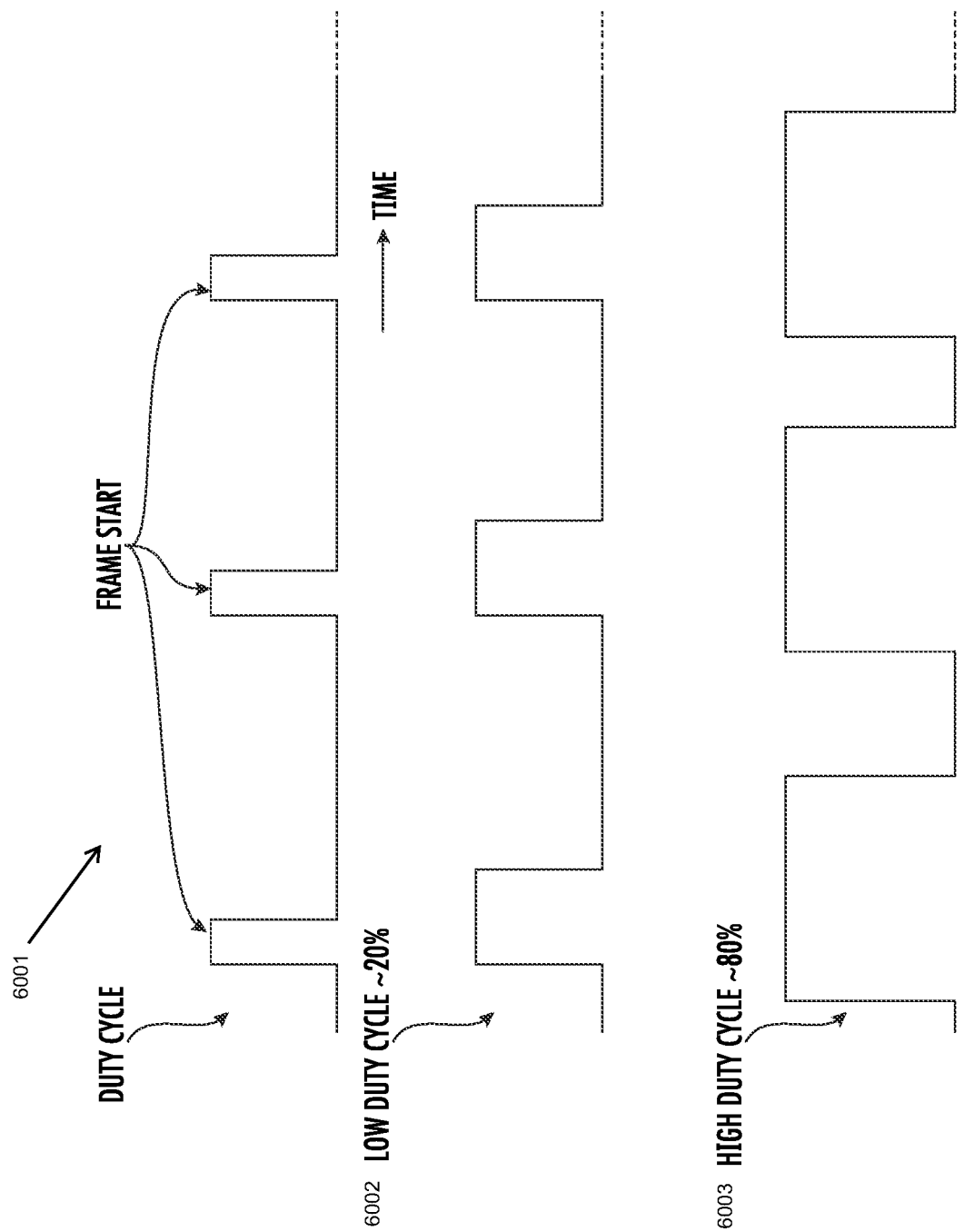

OPTICAL MODULE WITH ACTIVE MICROLENS ARRAY CAPABLE OF SYNCHRONIZING WITH SEE-THROUGH DISPLAY TO PROVIDE MULTIPLE MODES OF FUNCTIONALITY

BACKGROUND OF THE INVENTION

Field of the Invention

The present invention is directed to various ways to realize an Active (micro) Lenslet/Lens Array ("aMLA"), including system functionality utilizing such aMLAs, and related systems and operations.

The present invention is further directed to operation of a near eye augmented reality ("AR"), mixed reality ("MR"), extended reality, enhanced reality, or virtual reality ("VR") system that combines the virtual image generated by the near eye display with the real world environment taking into account, for example, the visual processes of the retina, the visual cortex, and the oculomotor system. Specifically, the current invention is directed to transparent or nearly transparent optical module ("TOM") architecture, which is built and/or configured in a manner to provide system scalability in higher resolution and later field of view and eye box. However, the invention herein can be directed to other near eye display architectures and optical solutions that comprise transparent display and aMLA for presenting an image overlaid with a real world view.

The present invention also is directed to a synchronization, in cases temporal synchronization, between the aMLAs and the display so that the two work together in concert to provide a user or manufacturer with the ability to choose different modes of functionality of the TOM, such as three-dimensional virtual image generation, two-dimensional image generation, stereo image formation, static MLA functionality, augmented or enhanced reality, variations (and adaptation) in brightness, and other modes including those described herein.

Description of the Related Art

Currently existing AR or MR systems in most cases have several shortcomings including, but not limited to, large shape/form factor, awkward wearability and utilization (due to problematic human ergonomics,) heavy hardware, uneven weight distribution, high power demand (due to low optical/light efficiency), thermal limitations, insufficient brightness for operating in daylight, and/or high price (and cost to manufacture). For these systems to have an increased level of adoption, a transformational technology change or innovation is needed to improve what is currently available. In addition, it is important that any such innovation can be easily adapted to current, established eyewear and ophthalmic lens manufacturing and distribution. The innovation disclosed herein teaches such a transformational breakthrough for the AR and MR industries. In this regard, the current innovation can also be used with virtual reality and extended/mixed reality.

SUMMARY OF THE INVENTION

In embodiments of the present invention, a transparent optical module ("TOM") system or device comprises an optical architecture hierarchy based on a patch unit. In aspects, the module may be transparent, transmissive, partially transparent, partially transmissive, opaque, partially opaque, or combinations thereof. In aspects, the patch unit comprises one or more regions of display pixels, or a pattern(s) or pixels, and an associated 2D array of small micro lenses (generally referred to herein as "lenses," "lenslets," or "micro lenses"), for example on an aMLA. (Herein, the terms lenslet, lens, and micro lens are used interchangeably with regard to the aMLA.) The lenslet is capable of collecting some or most of the light from the display pixels and transmitting that display-emitted light to an eye of the wearer of the TOM which then focuses the light to form a retinal image, which is seen or perceived by the wearer. The Display+MLA+eye together function to construct a virtual image that may appear (to the user looking through the display) to have come from infinity (far field), near the person (near field), or anywhere in between. Multiple TOMs can be combined to provide multiple (virtual) image planes and places. Alternatively, a single TOM with a variable MLA focal length (e.g., having focal plane diversity), can be used to generate for the user a perception of multiple image planes by varying the effective focal length of the MLA in time. Finally, both of the above methods maybe combined to realize additional focal plane diversity which can, for example, create a perception of a three-dimensional (3D) image(s), further enhancing the immersion effect of the display described herein.

In embodiments, regarding a vergence accommodation conflict, the above embodiment allows for resolving the vergence accommodation conflict by, for example, adjusting the virtual (lateral) location of the augmented reality images, as perceived by the eye, in proportion to their perceived distance. For example, as the virtual objects move from infinity (e.g., far field) closer to the viewer (e.g., to "near field"), their perceived lateral distance will also be adjusted (reduced) to overcome the vergence accommodation conflict.

In embodiments, the patch units can be combined further into patch groups, wherein members of a group serve a similar role in retinal image production as a patch unit and/or lenslet. This hierarchy allows the system to be scaled to larger and more complex systems, while maintaining lower complexity and lower cost via standardized TOM module bases.

Accordingly, TOM architecture is built in a manner that provides system scalability. In general, there are two basic elements of TOM architecture as described herein: a patch unit (optical) and a patch group (layout). A lenslet focuses a display pixel or patch to a retinal spot or portion. The lenslet field of view supports imaging an area of an xLED display, such as a pixel patch, and in aspects, "xLED" may be used to refer to, cover, or describe, but is not limited to: OLED (organic Light Emitting Diode), TOLED (transparent OLED), microLED (also μLED and mLED), iLED (refers to microLED, inorganic LED), PMOLED and AMOLED (Passive Matrix and Active Matrix OLEDs), QD-LED (quantum dot LED), or combinations thereof.

A lenslet and its corresponding pixel patch will generally be referred to herein as a patch unit. In aspects, multiple patch units are used to build a larger mosaic image on the retina. Due to magnification, a sparse set of patches and lenslets (i.e., patch unit(s)) can produce a full image as perceived by a user; accordingly, patch units are capable of being sparsely distributed due to magnification. In aspects, the display pixel patches form a sparse microdisplay. In aspects, patches of high density display pixels separated from one another by large areas free of pixels provide for a display or optical module that is highly transparent, allowing for low obstruction see-through viewing.

The intermediate area between primary patch units allows inclusion of additional patch units to provide extra functionality. Sets of patch units that produce retinal images that overlay each other (or in cases are separate or projected side-by-side on the retina) are sometimes defined herein as a patch group. In aspects, patch units are configured so that lenslets do not overlap. In cases, it may be necessary to shield light to control stray light transmitted in between lenslets or potentially couple to neighboring lenslets. Since patch units in a patch group can act individually, in aspects, a patch unit or units can be illuminated independently (in aspects, in both space and time), to support different functions. A grid of patch units can be rectangular or hexagonally packed or any other shape. Rectangular packing, in cases, simplifies some aspects of determining how to decompose the digital image data into sub-images. The notion of the patch unit and patch group or group of pixel patches applies to both static and active MLAs. In aspects, an aMLA may refer to, cover, or describe one or more of:

- switchable MLA as understood by one of ordinary skill in the art, such as switchable between two states as described herein;
- tunable MLA as understood by one of ordinary skill in the art, such as allowing two states and also having the capability of having intermediate lens states, including a range of tunable focal length(s);
- electrically switching lenslets;
- nematic phase liquid crystal-based lenslets;
- smectic phase liquid crystal-based lenslets;
- liquid crystals ("LC" or "LCs");
- cholesteric liquid crystals;
- polymer encapsulated or dispersed liquid crystals;
- nano-scale polymer encapsulated or dispersed liquid crystals;
- blue phase liquid crystal-based lenses;
- electrowetting lenslets;
- electrostatic lenslets;
- ferrofuidic lenslets;
- dielectrophoretic lenslets;
- pressure actuated liquid lenslets;
- micro-mechanical variable focus lenslets;
- elastomeric membrane lenslets;
- mechanically stretchable lenslets;
- chemically ion activated lenslets; and/or
- acousto-optical lenslets.

In embodiments, the invention is a system for producing an image including a see-through near eye optical module comprising a see-through near eye display and a micro-lenslet array, wherein the see-through near eye display comprises a plurality of light-emitting pixels or pixel patterns and the micro-lenslet array comprises one or more lenslets; wherein the plurality of light-emitting pixels are configured as a pixel patch; wherein a pixel patch in optical communication with (e.g., associated, coupled, or combined with) the one or more lenslets is configured as a patch unit; and wherein the see-through near eye display and the micro-lenslet array are capable of permitting light rays from a physical object in an external, real world environment to pass through the see-through near eye optical module to the user's retina. The light from the display and the light from the real world external environment, when combined together, are capable of generating augmented reality, mixed reality, enhanced reality, extended reality, virtual reality, etc. In aspects, the TOM and/or optical module is hermetically sealed. In aspects, hermetically sealing provides resilience with respect to ingress of water, air, UV light, and other unwanted things.

In aspects, the patch unit will include an aMLA that is capable of being turned "on" and "off." In the "off" configuration or mode, the aMLA can effectively act as a see-through window; for example when voltage (or current) is not applied (e.g., the system in naturally in an "off," i.e. transparent, state) and the lens is in a relaxed state. In some cases, if the aMLA is turned "on" constantly—such as by application of a voltage or current that changes an aMLA or aMLA lens index of refraction, form factor, curvature, shape, diffraction period, or combinations thereof—without cycling between "on" and "off," the aMLA will effectively act the same or similar to a static MLA as described herein. In aspects, a lens of the aMLA may comprise a conventional, a Fresnel, or a diffractive lens, wherein the shape (or optical prescription, e.g., design) of the lens can be spherical or aspherical.

In aspects, the aMLA will be synchronized (in aspects, in time) to the display so that the display (e.g., in some cases a pixel or pixels as described herein) may pulse light to coincide with an "on" mode of the aMLA. For example, in some embodiments, when the aMLA is turned "off," a user will be able to see through the TOM to the external environment, and when the aMLA is turned "on," a user will see a virtual image overlaid with the external environment. Because the eye-brain connection merges the external environment images with the pulsed virtual images, like it does to other multiple static image frames when viewed in rapid succession, such as a motion picture (e.g., movie or video), the TOM is capable of providing, for example, AR or MR that is seamless or nearly seamless (e.g., continuous) in appearance. More specifically, the synchronization between the display, such as a pixel, pixel patch, or patch group, and an associated aMLA(s), in aspects configured as a patch unit, causes the display to activate after or as soon as the aMLA is complete with its "rise time" and is in its "on" mode with a desired focal length (or optical power). Accordingly, the display will activate such pixels, pixel patches, or patch groups when the aMLA reaches its desired focal length (or optical power), creating a virtual image and therefore an AR/MR experience to a user. Pulsing the TOM allows for increased allowance of time for heat dissipation, and an increased perception of virtual image brightness (i.e., a higher value of nits), at a lower energy demand than that of an equivalent continuously emitting display, among other things as described herein. In other aspects, an additional feature of the variable/tunable focal length (optical power) of the aMLA is its ability to be tuned to adapt/compensate for eye imperfections and specifically for near and far sightedness so that people with optical prescriptions may be able to calibrate their aMLA-based AR devices to fully or partially compensate for their prescription. Both spherical/power and astigmatism can potentially be compensated for by adjusting the effective optical power that the aMLA is capable of achieving in its "on" state.

In embodiments, it is possible (and in aspects advantageous) to adjust for each and every (projected) frame, the ratio of "on" to "off" time interval (e.g., "duty cycle") of the aMLA and the display, changing the ratio from being "on" more or most of the time to being "off" more or most of the time. With the ratio being more or mostly "off" than "on," the display will provide more transparency, whereas having the display being more or mostly "on" than "off" will provide an emphasis on projecting the virtual image, thereby increasing its brightness as perceived by the user's eye. This can aid in an ability of the invention described herein to rapidly and seamlessly adjust/adapt to changing external brightness or ambient light levels such as, for example, when a user is exiting a dark environment and entering a well-lit environment when, for example, exiting a building, and vice versa. In aspects, this "on" to "off" cycle is called a "duty cycle," and the duty cycle can be dynamically and automatically adjusted depending on the ambient light environment. Thus a ratio of "on" to "off" state may be increased and thereby enhance a perceived brightness of the image or portion of an image provided by the display pixel(s), which is advantageous in a brightly lit ambient light environment. In a dimly lit environment, the ratio of "on" to "off" may decrease, allowing more light from the real world environment to pass through to a user's eye while also not creating such bright virtual image. The system allows these adjustments, in embodiments, at the patch unit level, the patch group level, the overall display level, and combinations thereof.

This temporal modulation between aMLA and display also allows for the TOM to be able to switch between different modes, such as, by way of example only, a two-dimensional mode, a three-dimensional mode, a window mode (i.e., a see-through window to an external environment without virtual imagery), a peripheral mode when additional information is displayed on the periphery of the abovementioned window (similar to how most cameras display exposure/histogram and other settings on the bottom or side of the frame to aid the user in setting a proper exposure), a "zoom in" and/or "zoom out" mode, a variable brightness mode, and other modes of varying functionalities that differentiate the system from currently available AR, MR, or VR technologies.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 6 is time scale showing a constant frame rate with changes to the duty cycle as a function of environmental ambient light, for example.

DETAILED DESCRIPTION

Figure 1:
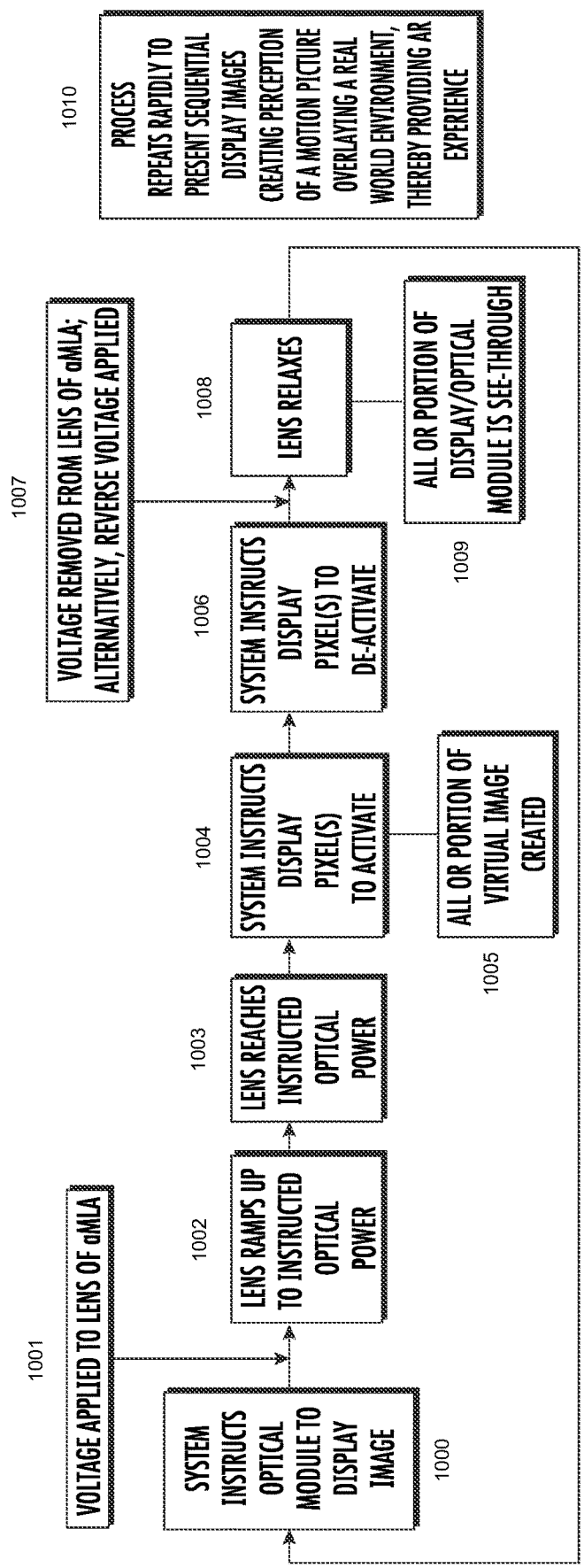
FIG. 1 is a flowchart showing an embodiment of the invention described herein as a timeline.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

According to embodiments described herein, there are various optical terms and parameters that describe operation and performance of an aMLA in optical communication with a pixel patch (e.g., "patch unit"). These terms include, but are not limited to, magnification, field of view ("FOV"), resolution, and visual acuity, by way of example. Some of these parameters may influence the optical design and manufacture of the lenslet as described herein, or as would be understood by one of skill in the art.

Further, factors such as the aMLA performance and stray light generation can have an influence on the design FOV. For example, an aspherical lens surface form may be necessary to improve imaging quality for pixels near an edge or extreme edge of the patch unit FOV. Additionally, the aMLA pitch and/or optical power can be designed to vary from the center to the edge of the lenslet array to help improve imaging properties (through minimizing Coma and other aberrations) from the periphery of the pixel patch. The patch unit (or patch units working in concert) FOV according to preferred embodiments described herein is designed to produce an image that can fill the high-resolution foveal region of a user's retina. The FOV in aspects can range from a 10-degree full angular field up to larger values (or smaller values, if needed). Therefore, multiple patch units and/or patch groups can be used to produce a complete wide-angle view.

In embodiments described herein, magnification may describe the relationship between the angular extent at the retina versus that of the display pixel patch or patch unit. In a possible embodiment of a transparent optical module ("TOM") design described herein, an image magnification is preferably about 7× to 10×, whereas a single lens, single display virtual reality system would have a magnification closer to 1.

The visual acuity of the eye refers to the clarity of vision and ability to recognize detail as described herein or as would be understood by one of skill in the art. The typical eye is able to detect about 1 arc minute angular resolution and is sometimes presented in the form of a measurement, such as 20/20 vision. The visual acuity (e.g., Image Quality ("IQ")) depends on the retinal resolving elements (rods and cones), aberrations from the eye's lens, and diffractive effects due to aperture size as well as the magnitude of the present stray light in a form of haze, etc. Scattered light, haze and other forms of spurious (stray) light can detrimentally affect Image Quality (IQ) and need to be considered and minimized and/or suppressed. The objective of the TOM as described herein is to present information that is a suitable or preferable match to the eye's visual acuity. For example, text should be sufficiently sharp and sufficiently large to be readable, while images should provide preferably well-resolved features. The application of the TOM and system described herein will in aspects determine the visual acuity level that the display, system, or TOM is able to achieve.

The stray light for an aMLA differs from a static MLA. In embodiments, an aMLA is expected to be "on" for only a fraction of time as a wearer uses the TOM described herein. During this switched "on" time, the aMLA operates as a set of lenslets while the display is synchronized to emit light and provide a virtual image or portion of a virtual image. During the switched "off" state, in aspects, the MLA has no optical power and therefore behaves as though it is a conventional transparent window, and the display does not emit light. During the "on" state, the stray light situation will be the same or similar as for a static MLA. However, when the aMLA is switched "off," typically less stray light will be present compared to a static MLA.

Since, in aspects, the aMLA needs a finite time to transition from "off" to "on" states, and vice versa, it is preferable to minimize the time between transitions, because during the transition time the aMLA is in a transient state, which can distort the image of the real-world environment that passes through the aMLA, resulting in haze and stray light. In embodiments herein, the "on"-"off" and "off"-"on" transition times preferably range from sub milliseconds (micro-seconds) to a few milliseconds. The "off" state is achieved, in embodiments, by allowing the lens(es) to relax, such as when a voltage (or current) is removed from the activating mechanism of the aMLA, or, alternatively, a reverse voltage (or current) is applied. (The "on" state in this example would occur by applying a voltage to the lens.) However, in aspects, the "off" state can be achieved by applying a voltage, while the "on" stage occurs by removing voltage or applying a reverse voltage (or current.)

EXAMPLES

System Operation

Figure 4:
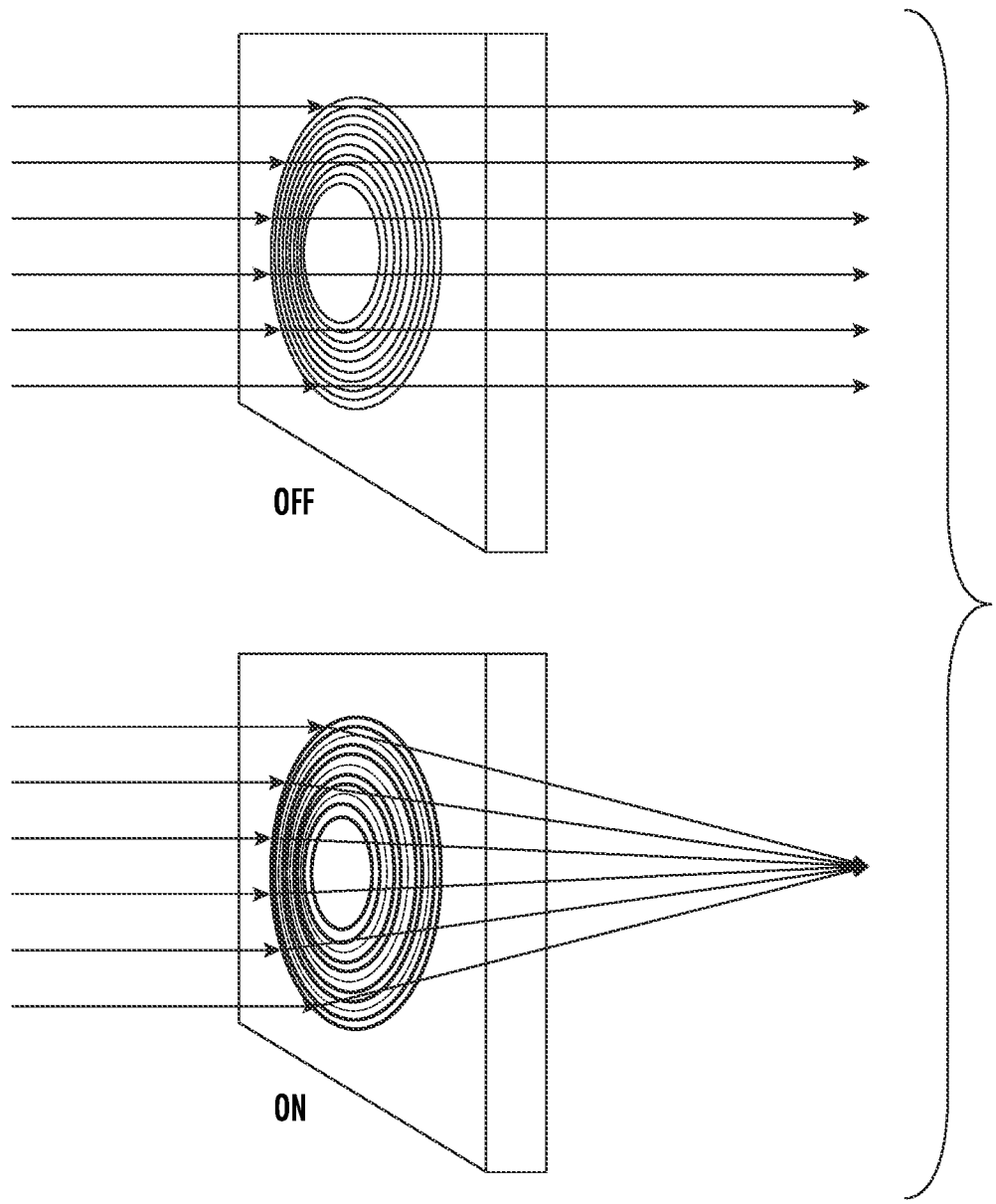
FIG. 4 is a schematic of a lens in an "off" and an "on" state.

In embodiments, the timing of the activation of the aMLA and the emission of the micro display located in its focal plane is such that each individual image "frame" begins by triggering the aMLA to turn "on" in order to generate a preset focal length value or optical power. Regardless of the aMLA technology (as described further herein or as would be known to one of ordinary skill in the art), typically there is a short time period that the aMLA requires to transition from an "off" (e.g., plane window) state to an "on" (e.g., "lens") state. (See, e.g., FIG. 4.) This "ramp-up" time, or "rise time," is usually measured in a few milliseconds or less. In aspects, an electronic circuit will "trigger" the activation of the aMLA and then, after a preset activation time has passed and the aMLA has settled into or achieved its "on" (e.g., "lens" state), the electronic circuit will trigger the micro display to display (flash or pulse) a virtual image, such as information to be projected into the eye. The display can be of a short duration, on the order of around 30 milliseconds corresponding to an approximately 30 fps, but possibly shorter or longer, such as from 0-10 milliseconds, 10-20 milliseconds, 30-40 milliseconds, 40-50 milliseconds, and so on.

An advantage of operating the micro display in a pulse/flash mode as described herein is multifold. Electrically it enables "overdriving" the light emitting mechanism of the display, which makes the display capable of achieving a brighter (in cases, instantaneous) emission/brightness (in cases, measured in watts/Nits) than would be possible if the display was to operate in continuous emission mode (e.g., a "steady state"). This can be an advantage because it enables most displays to be able to better handle the electrical and thermal load due to an intermittent, e.g., "pulse," display activation without compromising its performance and lifespan. Additional functional advantages for the TOM described herein, based on, e.g., operation in an intermittent pulse mode (pulsed light), is that the retina of the eye perceives pulsed light intensity as brighter than the same intensity of light emitted in continuous (e.g., non-pulse) fashion, because humans are typically more sensitive to blinking/pulsing lights. Moreover, this pulse mode of operation is well suited to the temporal nature of the aMLA-based TOM architecture, which provides for both an intermittent bright image and a low stray light pass-through, which enables the viewer to more seamlessly perceive both the real-world and the augmented reality information (e.g., virtual image) naturally superimposed on each other in time merging into a combined scene (e.g., motion picture) as seen or perceived by the viewer. Thus, rapid alternating or oscillating between "off" and "on" state and/or between duty cycles allows for the presentation of rapid and sequential presentation of images in an order to create the perception of movement; when overlaid with a real world environment, this allows for creation of AR or MR, for example.

Pulsing the light and synchronizing the pulsed light with the aMLA in the "on" state, preferably after the "rise" or "ramp up" time is complete and the aMLA is at a desired focal length (or optical power), requires less energy than a steady state light and therefore creates less heat, which can be uncomfortable to a wearer using a near eye display system and which can more rapidly degrade the xLED and other system components. The partial duty cycle pulsing and synching also allows for a user or manufacturer to choose different modes of operation or functionality. For example, a user could switch the aMLAs into an "off" state to create a see-through window. A user could use an "on" state to create a two-dimensional virtual image, which is preferable in some cases for virtual text. A user could use an "on" state to create three-dimensional images, such as when different parts of an object are to be perceived as being at different distances or depths from the user; for example, an aMLA from one patch unit showing one part of the object might have one effective focal length (optical power) while another aMLA showing a second part of the object might have a different focal length (optical power), thereby creating a perceived three-dimensional image.

The display pixels may be monochromatic (e.g., a single color such as Red, Green, or Blue) or polychromatic (e.g., capable of emitting any and all of the aforementioned colors).

Different TOMs may have different combination of colors such as RGB and CMY (Cyan, Magenta, Yellow, etc.) to provide for a more rich color gamut and 3D effects. In the case of a single aMLA having a single focal length (optical power) that is wavelength dependent, a different voltage (or current) can be applied to optimize the aMLA to provide consistent (uniform) optical power for each wavelength. For example, each individual wavelength can be emitted in rapid sequence and for each wavelength the aMLA can rapidly adjust its optical power (effective focal length) to provide uniform focusing across all wavelengths thereby behaving like a apochromatic lens (e.g., a lens which has a constant focal length (and therefore magnification) regardless of wavelength). This may enable a realization of a multi-color virtual reality without the additional complexity of using a polychromatic lens.

If the system includes an ambient light sensor, the system can instantaneously or gradually adjust or adapt to changes in brightness, such as increasing or decreasing the duty cycle. In aspects, the duty cycle is capable of automatically adjusting (or in cases being manually adjusted) as a function of ambient light in the environment. In embodiments, when the ambient light is bright the duty cycle will be longer, meaning the pixels will remain activated (and the lenses will have optical power) for a longer period of time compared to the see-through aspect when the pixels are deactivated, the lenses are relaxed, and the system, display, or portion of the display are in a see-through state. (See FIG. 5—showing graphs which are not overlaid but which all share the same time axis, thereby depicting the relative timings of the signals/operations over about three cycles (about a 50% duty cycle in the example of FIG. 5).) While the duty cycle may change (e.g., when the "on" state may be longer in duration than the "off" state, such as in brighter environments), the frame rate of the sequential presentation of images (e.g., the motion picture of virtual images being presented to a user of the system) is capable of remaining constant, thereby allowing the user to move from different ambient lighting situations while not having the video, frame rate, motion pictures, images, frames, or other augmented reality experience negatively affected.

Figure 5:
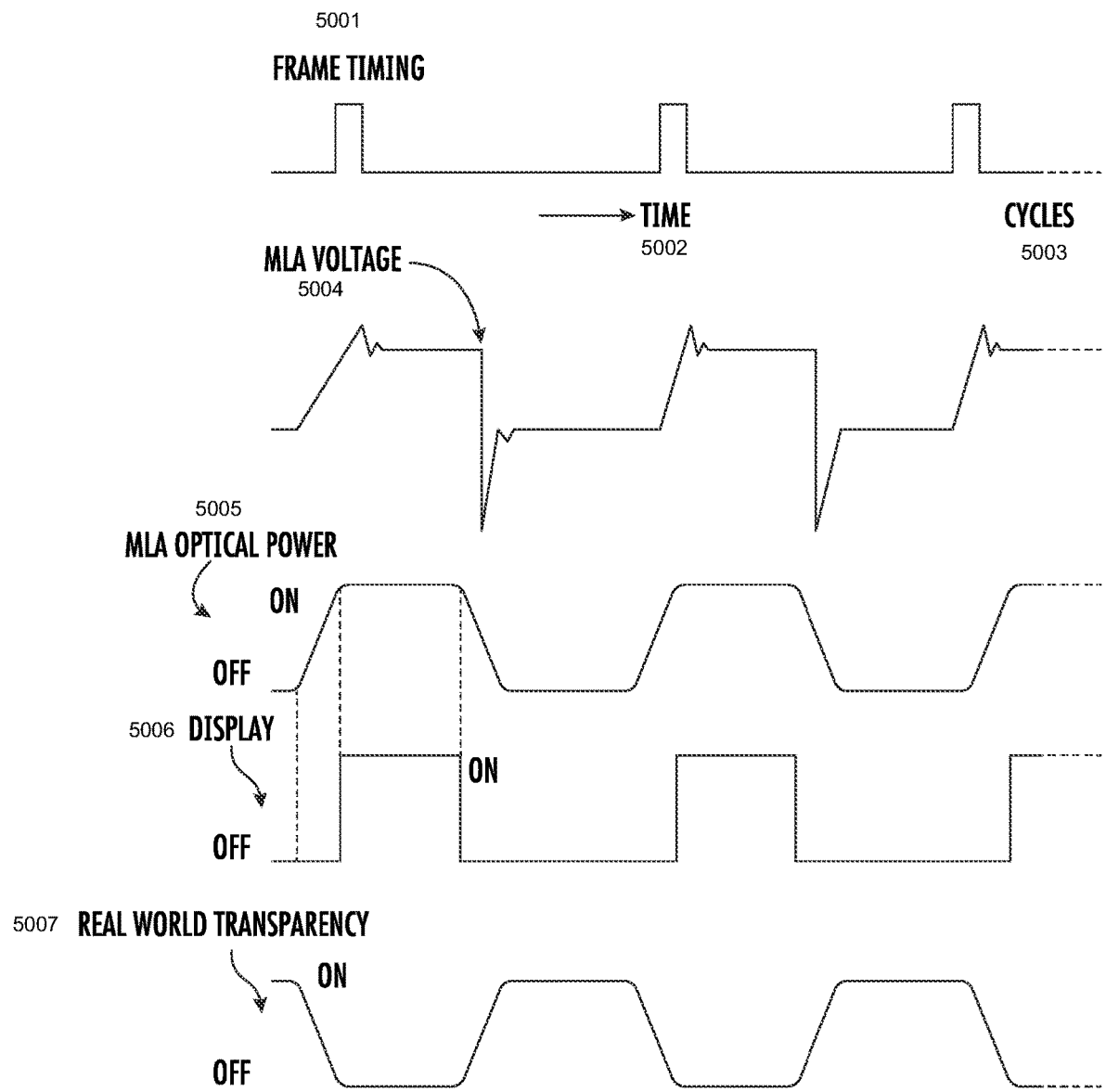
FIG. 5 is time scale showing a constant frame rate with changes to the duty cycle as a function of environmental ambient light, for example.

Thus, FIG. 5 indicates that the frame rate (or frame timing 5001) remains constant over time 5002 as it cycles 5003. However, if the wearer of the system moves to a bright or brighter environment, the system will need to compensate by making the virtual images appear brighter to the wearer, which may be accomplished by increasing the duration of the duty cycle, meaning the pixels remain "on" and the lens provides optical power for a longer period of time. As can be seen in FIG. 5, voltage 5004 can applied to the aMLA or switchable lens of the aMLA for a longer period of time, thereby making the lens maintain its desired/instructed optical power 5005 for a longer duration. Similarly, the display pixel(s) 5006 can be activated for a longer period of time when the associated lens has its desired/instructed optical power. This increase of the duty cycle (increase of ratio of "on" to "off" time/state) renders the virtual image(s) brighter and better able to be perceived by a wearer of the system in a brighter environment. Thus, while FIG. 5 shows about a 50% duty cycle, the duty cycle can change based on ambient light conditions. Consequently, while duty cycles can all be the same length of time, the ratio of "on" to "off" can change as a function of ambient light. In examples, the duty cycle can have the "on" period last longer than the "off" period, such as in a bright environment when a wearer of the system should see the virtual image(s) for a longer duration than the real world environment (when the optical module is see-through or transparent 5007). This is reflected in FIG. 6, for example.

As shown in FIG. 6—which shows the difference between a high or higher duty cycle (also referred to herein as a longer duty cycle) (higher ratio of "on" to "off") 6003 and a low or lower duty cycle (also referred to herein as a shorter duty cycle) (lower ratio of "on" to "off") 6002 for a fixed frame rate 6001—in a low or lower light environment the duty cycle is capable of automatically adjusting to a lower/shorter duty cycle, meaning the virtual image brightness is decreased and the see-through state of the system is increased, thereby allowing the user to better see the (dimmer) real world environment. This allows the wearer of the system to be able to better see the real world environment in low light, while also seeing the virtual image(s), all while not having the frame rate negatively affected. More specifically as shown in FIG. 6, in a low light environment, the duty cycle may change the ratio of "on" to "off" state to prioritize the "off" state to enhance light from the real world to enter a wearer's eye; in other words, in a lower light environment, the aMLA or lens of the aMLA is at its desired/instructed optical power for a shorter period of time. Similarly, the display pixel(s) associated with the lens are activated for a shorter period of time, thereby increasing the amount of time the system is in a see-through state and the wearer can see the real world environment. By way of example only, and not to limit the scope of the invention, a shorter duty cycle may be from 10% to 30% of the cycle having the lens at optical power and the display pixel(s) activated (i.e., the "on" state), whereas a higher/longer duty cycle may have the lens at optical power and the display pixel(s) activated (i.e., the "on" state) between 70% and 90% of the cycle.

An aMLA used in this fashion also resolves issues of stray light, blur, or imperfections in seeing a real world environment through the TOM, because the system will have increased transparency when the system is in "off" mode compared to, for example, a system using static MLAs or a system without pulsing light. This increased transparency when the aMLAs are in "off" mode creates for a more realistic augmented reality experience by a user, including when combined with the enhanced virtual image brightness caused by the pulsed light.

In aspects and as understood by one of skill in the art, stray light is light that does not follow the correct or preferred path through the TOM and may produce a glare or background haze that reduces overall contrast of the desired images. The desired image light, in aspects, includes the real world view formed from light from the external world that passes through the transparent areas of the display substrate and the regions between lenslets on the MLA, especially in the case of a static MLA.

In embodiments, a desired virtual image is formed from light emitted by a display pixel or pixel patch, for example, and then directed through its patch unit lenslet to the eye forming the retinal image. Real world light that passes through a lenslet and is redirected is one form of stray light. Another form of stray light is display light that passes through the region between lenslets and is therefore not focused. Also, light from a patch unit pixel or pixel patch that passes through an adjacent or distant patch unit lenslet (and, in cases, misses its own patch unit lenslet) will be focused incorrectly and is considered stray light.

In embodiments, the invention provides a gray scale (transmission) transition from the periphery of the display patches that start opaque at the edge of the opaque display and gradually transition to fully transparent over a distance of about 10-50 wavelengths of light, resulting in reduced edge diffraction effects. Such a gradual transition can be realized through gradient metal other coating, or hair-like extensions emanating from the edge of the display area which are gradually reducing in width the farther they extend beyond the edge of the display, resulting in a net perception of a gradual increase in transparency along their extension away from the opaque display edge. This is capable of reducing the spurious (stray) light that will diffract from the edges of opaque display patches.

In embodiments, a pixel's or pixel patch's emitted light may be directed through a refractive, reflective, and/or diffractive TOM lens or lenslet. In embodiments, the lenslet may be fabricated as a curved surface on an optically transparent substrate. The surface may have a spherical, aspherical, or other arbitrary mathematical description. The lenslet could also provide focusing capability by dynamically adjusting its power generating properties such as index of refraction and/or curvature structures. The lenslet may be composed of multiple layers of material or a single material. A diffractive or holographic element may direct the light using wave interference methods. The lenslet may comprise a single surface on a supporting substrate, or be composed of multiple surfaces on dual sides of the substrate or multiple substrates. The apertures of a multiple component lenslet may be oriented in line with each other, or not. The lenslet or lenslet set may be decomposed into multiple areas with intervening transparent or shielding areas. The lenslet apertures may be circular, square, hexagonal, or any arbitrary shape for optimum Image quality while minimizing stray light.

The use of Liquid Crystals (LCs) is one way to realize an aMLA by means of electrically switching the LC's index of refraction. A number of different LC technologies may be used separately or in combinations, these are, for example, conventional nematic or smectic phase and cholesteric liquid crystals. Additionally, in embodiments herein, polymer dispersed (or alternatively encapsulated) LCs (PDLCs) as well as their nano-scale variety (nPDLCs) may offer advantages for construction of aMLAs, as the nPDLCs are polarization invariant and therefore can utilize unpolarized light from conventional displays such as OLEDs and iLEDS, by way of example. Additionally, "blue" phase LCs may also possess desirable polarization independent properties, in aspects.

Figure 2:
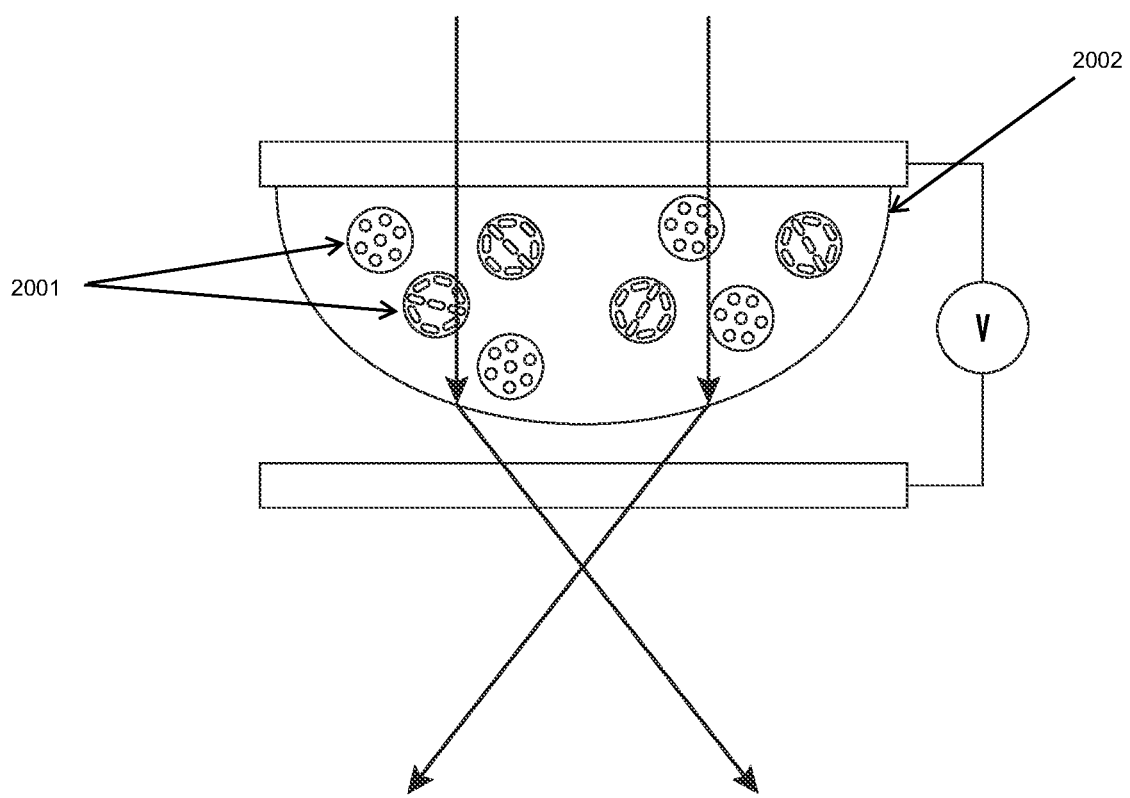
FIG. 2 is a schematic of an optical module as described herein in the "on" state, or when the aMLA or lens in the aMLA has optical power.
Figure 3:
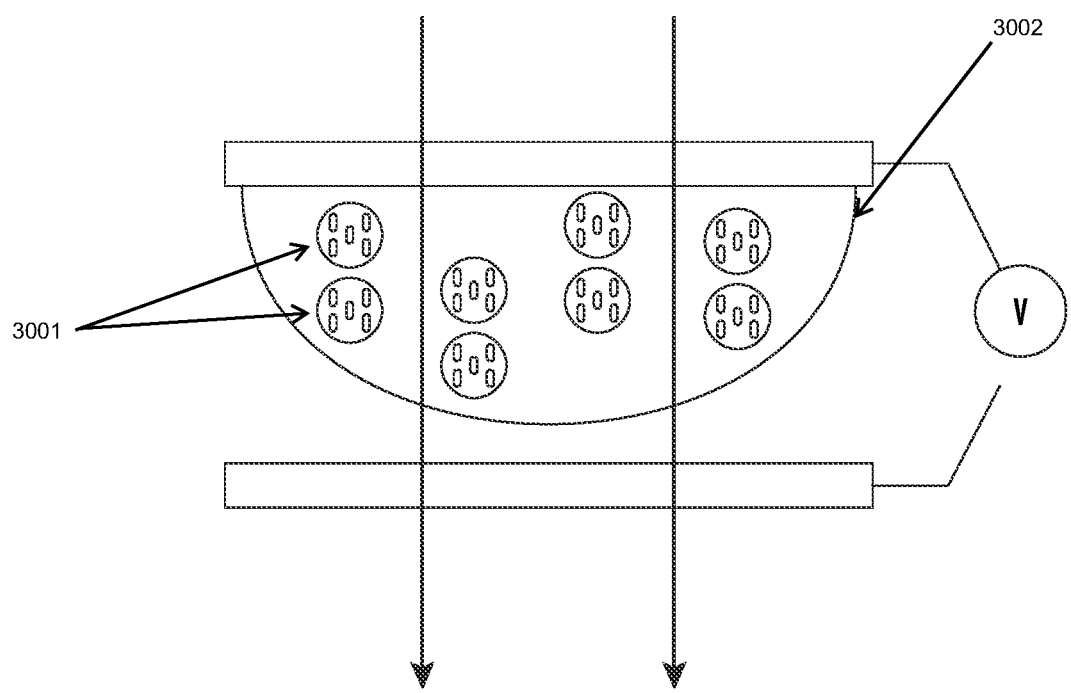
FIG. 3 is a schematic of an optical module as described herein in the "off" state, or when the aMLA or lens in the aMLA is in a relaxed, see-through state.

In FIG. 2, a non-limiting embodiment is shown wherein when voltage is applied to a lens comprising liquid crystals 2001 embedded in a shaped material region 2002, the liquid crystals manipulate light moving through the lens (e.g., change the lens' index of refraction) such that the lens region has optical (e.g., focusing) power, whereas in FIG. 3, when voltage is removed from the lens comprising liquid crystals 3001, the lens region 3002 has the same optical properties as the surrounding material and it becomes see-through.

All of the above LC variations can be employed to construct conventional aMLAs (e.g., refractive lenses), as have been described herein, as well as flattened lenses such as Fresnel, diffractive, and holographic aMLAs. Further, all of the above lens technologies maybe used separately or in combination in order to realize optimal aMLA performance.

In additional to LCs, other technologies can be employed for fabrication of aMLAs; these include, but are not limited to, Electrowetting, Electrostatic, Ferrofuidic and Dielectrophoretic, and pressure actuated Liquid Lenses. Various micro-mechanical variable focus lenses may also be used such as Elastomeric Membranes, which are stretched or compressed by mechanical means. Chemically ion activated lenses and lenses that utilize the various Acousto-Optical effects can also be employed as and/or in aMLAs.

Electrowetting (EW) aMLAs

EW lens' functionality relies on the ability to vary the surface tension of liquids via applied voltage, in aspects. For a given liquid drop, its surface tension generates a predictable radius of curvature which in turn refracts light either in convergent (or divergent) fashion, with the former creating a functional equivalent of a positive lens.

With proper shaping of the container holding the liquid, a negative lens may also be realized, which in combination with a static (or active) positive lens may provide a range of tunning as needed to realize the functionality of the aMLA.

For example, variable voltage can be applied to a pair of electrically conductive liquids to change the surface tension and therefore the radius of curvature via a change in voltage. The result is an effective lens of variable optical power. In cases, such control over lens optical power can be used to vary the lens's optical power from zero (e.g., flat non-power plane window) to a preset value as needed to achieve a desired (e.g., effective) focal length ("efl") (and/or magnification). One can also introduce diversity to the efl resulting in a plurality of focal planes perceived by the eye to be located at different distances in the far field which, when combined with their associated images, will result in the eye-brain system constructing a three-dimensional image by merging a series of focal planes rapidly displayed sequentially in time similar to how humans perceive motion pictures through rapid temporally multiplexed images arranged to be sequential in time at frame rates as low as 20 frames per second ("fps"), although preferably at around 30 fps or higher.

In aspects, multiplexing refers to a method by which multiple analog or digital signals are combined into one signal over a shared medium. The aim is to share a scarce resource. Therefore, several signals or channels can be combined together and then separated at the receiver end. For example only, radio multiplexes several channels on an electromagnetic spectrum by assigning each channel its own frequency. Then a radio receiver can choose the channel it wants. By way of example only and non-limiting in terms of the current application's scope, time multiplexing is in some aspects similar to having a freight train with several box cars, wherein each car represents a slice in time. A portion of a signal is concentrated and assigned to a car. Upon delivery, the desired signal is extracted from each slot/car and recombined.

With respect to the currently described multiplexed system described herein, the system assigns time periods when the display (e.g., display pixels) is enabled or activated, and time periods where the real world is viewed through, for example, the aMLA. Preferably the system does not want a user's eyes to extract, see, or perceive each individual time slot. Rather, the system preferably provides a continual virtual display and continual real world view. Thus, the time periods of the display, for example, are presented rapidly and sequentially (in order) to create the perception of a moving (or alternatively "live" (as opposed to static)) virtual image/object, in embodiments. These are presented along with rapid portions of time when the system is see-through. When you combine rapid periods (alternatively interval durations,) of display and rapid periods of the user being able to see the real world, it creates an augmented reality experience wherein a user perceives a seamless or near-seamless moving virtual image, in aspects, overlaid (or superimposed) over the real world. However, if one was to review the electronic control signals, there would exist time slots assigned to the virtual display (a frame, for example) and the remainder of the time assigned to the real world view. Therefore, in aspects, the time multiplexed system described herein has two channels. And in aspects, when the frames/images are seen at an "on" state of the aMLA and the display, they are fused and perceived as "on" state animation through the time of "on" and "off" states. The technique/system described herein, in embodiments, takes advantage of the limited ability of the human visual system to perceive high spatio-temporal frequencies.

Using another example, the human eye/brain interaction can demultiplex the time sequence if the frame rate is well below about 20 frames per second. That is, the virtual image appears to flicker at low frame rates. Above that frame rate, the human perceptual system cannot separate the image/frame stream, and it appears to flow from one frame to the next. Thus the real world view and the virtual image information is prepared in a time multiplexed form, but a wearer's perception (eye/brain interaction) is not able to demultiplex the stream and both signals appear combined to be natural and stream simultaneously to the wearer, wherein the continuous image/frame stream is overlaid with a real world view, providing augmented reality to the wearer.

EW lenses can be realized using a number of available liquids. Examples of liquids which can be used are, by way of example, various alcohols, more complex hydrocarbons, both solvents and oils, and water. Mercury is also a candidate, but it is typically not applicable to realizing EW lenses operating in transmission, rather in reflection. Electronically, the EW system operates as a (variable) capacitor that dissipates little to no heat and therefore it "consumes" low power and its response can be in the sub-millisecond range for sub-millimeter class EW lenses.

The MLA technologies described herein can be used separately and/or in combination to optimize image quality and also to minimize undesired stray light.

Turning to particular figures, FIG. 1 shows a possible embodiment of the present invention for the system instructing the optical module to display an image or part of an image 1000. In this example, voltage (or current) is applied to a lens, some lenses, or all the lenses of the aMLA 1001. In response to the voltage (or current) the lens or lenses ramp up to an optical power as determined and/or instructed by the system 1002. The lens or lenses reach the instructed optical power 1003 and the system instructs an associated display pixel(s) to activate 1004, which provides all or a portion of a virtual image to a wearer of the system 1005. Then the system instructs the display pixel(s) to de-activate 1006 and a voltage (or current) is removed from the lens or lenses, or, optionally, a reverse-voltage or reverse-current is applied to the lens or lenses 1007, and the lens or lenses relax 1008, rendering all or a portion of the display/optical module see-through so a wearer of the system can see through to the outside real world environment 1009. This process repeats rapidly to present sequential display images creating a perception of a motion picture overlaying the real world environment, thereby providing an AR experience to the wearer 1010.

Embodiments of the invention also include a computer readable medium comprising one or more computer files containing applications, frameworks, libraries, and such, comprising a set of computer-executable instructions for performing one or more of the calculations, steps, processes and operations described and/or depicted herein. In exemplary embodiments, the files may be stored contiguously or non-contiguously on the computer-readable and/or device-readable medium. Embodiments may include a computer program product comprising the computer files, either in the form of the computer-readable medium comprising the computer files and, optionally, made available to a consumer through packaging, or alternatively made available to a consumer through electronic distribution. A s used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), memory card, and RAM. In exemplary embodiments, the computer readable medium has a set of instructions stored thereon which, when executed by a processor, cause the processor to perform tasks, based on data stored in the electronic database on the computer or cloud, or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers, in personal communication device and/or devices, or be stored in cloud computer. A skilled artisan will further appreciate, in light of this disclosure, how the invention can be implemented, in addition to software, using hardware or firmware. As such, as used herein, the operations of the invention can be implemented in a system comprising a combination of software, hardware, and/or firmware.

Embodiments of this disclosure include one or more computers or devices loaded with a set of the computer-executable instructions described herein. The computers or devices may be a general purpose computer, a special-purpose computer, personal communication device, or other programmable data processing apparatus to produce a particular machine, such that the one or more computers or devices are instructed and configured to carry out the calculations, sensor data collecting and processing, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (e.g., processor or System on Chip ("SOC")) and a form of computer-readable memory which may include random-access memory ("RAM") or read-only memory ("ROM"). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, wearable device (e.g., electronic watch, smart glasses or HMD—Head Mounted Display), or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output user interfaces may include a graphical user interface (GUI), voice command interface, gesture interface, gaze interface, or combinations thereof, which may be used in conjunction with the computer-executable code and electronic databases. The graphical user interface gesture interface, gaze interface, or combinations thereof, may allow a user to perform these tasks through the use of text fields, check boxes, pull-downs, command buttons, voice commands, various gestures gaze as a selection mechanism, and the like. A skilled artisan will appreciate how such user features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A computer-implemented augmented reality, mixed reality, extended reality, enhanced reality, or virtual reality system comprising:
    an optical module comprising a display comprising a plurality of display pixels and an active micro lens array (aMLA) comprising one or more switchable or tunable micro lenses wherein the one or more switchable or tunable micro lenses are associated with one or more display pixels of the plurality of the display pixels;
    wherein the one or more display pixels of the plurality of display pixels and the one or more switchable or tunable micro lenses of the aMLA are synchronized or coordinated, wherein when a change in voltage or current to the one or more switchable or tunable micro lenses of the aMLA occurs, the one or more switchable or tunable micro lenses switch between a mode having an optical power determined by the system and a mode having less or no optical power as a result of a change to an index of refraction, form factor, curvature, shape, effective diffracting period, or combinations thereof;
    wherein when the system instructs the one or more switchable or tunable micro lenses to operate with the optical power determined by the system, the system instructs the associated one or more display pixels of the plurality of display pixels to activate when the one or more switchable or tunable lenses is approaching or reaches the optical power determined by the system, rendering a virtual image or a part of a virtual image to a wearer of the augmented reality, mixed reality, extended reality, enhanced reality, or virtual reality system;
    wherein when voltage or current is not applied, or optionally when a reverse-voltage or reverse-current is applied, to the one or more switchable or tunable lenses of the aMLA, the system instructs the one or more display pixels of the plurality of display pixels to de-activate, rendering an area or volume of the optical module with the one or more switchable or tunable lenses of the aMLA and the one or more display pixels of the plurality of display pixels in a see-though state, wherein the see-through state allows the wearer of the augmented reality, mixed reality, extended reality, enhanced reality, or virtual reality system to see through the area or volume of the optical module to a real world environment;
    wherein the system pulses the synchronized or coordinated one or more switchable or tunable micro lenses and the one or more display pixels of the plurality of display pixels, rendering the system capable of cycling the optical power of the one or more switchable or tunable micro lenses and activation of the associated one or more display pixels of the plurality of display pixels to render a sequential presentation of virtual images or parts of virtual images combined with a real world view;
    wherein time multiplexing of the sequential presentation of the virtual images or the parts of the virtual images is capable of presenting the virtual images or the parts of the virtual images as a continuously flowing or moving of the virtual images or the parts of the virtual images, wherein overlaying the continuously flowing or moving virtual images or parts of the virtual images with the real world view is capable of creating an experience or perception of augmented reality, mixed reality, extended reality, enhanced reality, or virtual reality to the wearer of the augmented reality, mixed reality, extended reality, enhanced reality, or virtual reality system.

2. The computer-implemented augmented reality, mixed reality, extended reality, enhanced reality, or virtual reality system of claim 1, wherein when the system is in the see-through state, the system is about 90% transparent or higher.

3. The computer-implemented augmented reality, mixed reality, extended reality, enhanced reality, or virtual reality system of claim 1, wherein when the system is in the see-through state, the system is at least 80% transparent.

4. The computer-implemented augmented reality, mixed reality, extended reality, enhanced reality, or virtual reality system of claim 1, wherein the time multiplexing of the sequential presentation of the virtual images or the parts of the virtual images creates a perception of a motion picture, motion graphics, an animation, or combinations thereof.

5. The computer-implemented augmented reality, mixed reality, extended reality, enhanced reality, or virtual reality system of claim 1, wherein the time multiplexing of the sequential presentation of the virtual images or the parts of the virtual images is over about 20 frames per second.

6. The computer-implemented augmented reality, mixed reality, extended reality, enhanced reality, or virtual reality system of claim 1, wherein the time multiplexing of the sequential presentation of the virtual images or the parts of the virtual images occurs at a rate capable of allowing the wearer of the system to perceive combined virtual images or parts of the virtual images in a seamless or mostly seamless motion picture or a stable virtual image.

7. The computer-implemented augmented reality, mixed reality, extended reality, enhanced reality, or virtual reality system of claim 1, wherein the system is capable of automatically determining an amount of frames per second for a video, and the automatic frames per second determination is dependent on video content, imagery content, or system application.

8. The computer-implemented augmented reality, mixed reality, extended reality, enhanced reality, or virtual reality system of claim 1, wherein the system is capable of stitching the virtual images or parts of the virtual images together to create a perception of a combined image, a motion picture, motion graphics, an animation, or combinations thereof.

9. The computer-implemented augmented reality, mixed reality, extended reality, enhanced reality, or virtual reality system of claim 1, wherein the switchable or tunable micro lenses comprise conventional, Fresnel, or diffractive, and wherein the shape of the switchable or tunable micro lenses are spherical or aspherical.

10. The computer-implemented augmented reality, mixed reality, extended reality, enhanced reality, or virtual reality system of claim 1, wherein the switchable or tunable micro lenses comprise one or more of electrostatic, dielectrophoretic, electrowetting lenses, liquid crystals, polymer micro and nano-dispersed liquid crystals, or combinations thereof.

11. The computer-implemented augmented reality, mixed reality, extended reality, enhanced reality, or virtual reality system of claim 1, wherein the optical module is partially or sparsely populated with the display pixels.

12. The computer-implemented augmented reality, mixed reality, extended reality, enhanced reality, or virtual reality system of claim 1, wherein the system is capable of automatically determining a duty cycle of the system, the one or more switchable or tunable micro lenses, the one or more display pixels, or combinations thereof, depending on an amount of environmental ambient light, and wherein when the system is in a low-light environment a short duty cycle is applied, and wherein when the system is in a high-light or bright environment a longer duty cycle is applied.

13. The computer-implemented augmented reality, mixed reality, extended reality, enhanced reality, or virtual reality system of claim 1, wherein the system is capable of automatically determining a duty cycle of the system, the one or more switchable or tunable micro lenses, the one or more display pixels, or combinations thereof, and wherein when the system is in a low light environment the system instructs the one or more switchable or tunable micro lenses to operate in the see-through state when the one or more display pixels are deactivated for a longer duration of time than the mode having an optical power determined by the system when the one or more display pixels are activated.

14. The computer-implemented augmented reality, mixed reality, extended reality, enhanced reality, or virtual reality system of claim 1, wherein the system is capable of automatically determining a duty cycle of the system, the one or more switchable or tunable micro lenses, the one or more display pixels, or combinations thereof, and wherein when the system is in a high-light or bright environment the system instructs the one or more switchable or tunable micro lenses to operate in the mode having an optical power determined by the system when the one or more display pixels are activated for a longer duration of time compared to when the one or more switchable or tunable micro lenses operate in the see-through state and when the one or more display pixels are deactivated.

15. The computer-implemented augmented reality, mixed reality, extended reality, enhanced reality, or virtual reality system of claim 1, wherein the system is capable of automatically determining a duty cycle of the system, the one or more switchable or tunable micro lenses, the one or more display pixels, or combinations thereof, and wherein the duty cycle is dependent on an amount of ambient light in the real world environment.

16. The computer-implemented augmented reality, mixed reality, extended reality, enhanced reality, or virtual reality system of claim 1, wherein the system is capable of automatically determining a pulse timing or duration of the system, the one or more switchable or tunable micro lenses, the one or more display pixels, or combinations thereof, and wherein the pulse timing or duration is dependent on an amount of ambient light in the real world environment.

17. The computer-implemented augmented reality, mixed reality, extended reality, enhanced reality, or virtual reality system of claim 1, wherein the system is capable of automatically determining a duty cycle of the system based on ambient light conditions and monitoring ambient light conditions to modify the duty cycle based on the ambient light conditions.

18. The computer-implemented augmented reality, mixed reality, extended reality, enhanced reality, or virtual reality system of claim 1, wherein a duty cycle of the system is automatically computed and applied by the system to maintain a virtual image quantity or quality and see-through quantity or quality as an ambient light environment fluctuates or changes.

19. An augmented reality, mixed reality, extended reality, enhanced reality, or virtual reality system comprising:
   an optical module comprising a plurality of display pixels and an active micro lens array (aMLA) comprising a plurality of switchable or tunable micro lenses wherein one or more of the switchable or tunable micro lenses of the plurality of switchable or tunable micro lenses are associated with one or more display pixels of the plurality of display pixels;
   wherein the one or more display pixels and the one or more switchable or tunable micro lenses are synchronized or coordinated, wherein when voltage or current is removed from the one or more switchable or tunable micro lenses, the one or more switchable or tunable micro lenses ramp up to a state having a desired optical power as a result of a first change to an index of refraction, form factor, curvature, shape, diffractive period, or combination thereof;
   wherein when the voltage or the current is applied to, or optionally a reverse-voltage or a reverse-current is applied to, the one or more switchable or tunable micro lenses, the one or more switchable or tunable micro lenses transition to a state having less or no optical power as a result of a second change to an index of refraction, form factor, curvature, shape, diffractive period, or combination thereof;
   wherein the system instructs the associated one or more display pixels to activate when the one or more switchable or tunable micro lenses reach the state having the desired optical power, rendering a virtual image or part of a virtual image to a wearer of the augmented reality, mixed reality, extended reality, enhanced reality, or virtual reality system;
   wherein when the voltage or the current is applied to, or optionally the reverse-voltage or the reverse-current is applied to, the one or more switchable or tunable micro lenses, the system instructs the one or more display pixels to de-activate, rendering that area or volume of the optical module in a see-though optical module state and allowing the wearer of the augmented reality, mixed reality, extended reality, enhanced reality, or virtual reality system to see through that area or volume of the optical module to a real world environment;

wherein the system pulses the synchronized or coordinated one or more switchable or tunable micro lenses and the one or more display pixels, rendering the system capable of cycling optical power of the one or more switchable or tunable micro lenses and activation of the associated one or more display pixels to render a sequential presentation of virtual images or parts of virtual images combined with a real world view, thereby producing an experience or perception of augmented reality, mixed reality, extended reality, enhanced reality, or virtual reality to the wearer of the augmented reality, mixed reality, extended reality, enhanced reality, or virtual reality system.

20. The augmented reality, mixed reality, extended reality, enhanced reality, or virtual reality system of claim 19, wherein when the optical module is in the see-though optical module state, the optical module is about 90% transparent or higher.

21. The augmented reality, mixed reality, extended reality, enhanced reality, or virtual reality system of claim 19, wherein when the optical module is in the see-though optical module state, the optical module is at least 80% transparent.

22. The augmented reality, mixed reality, extended reality, enhanced reality, or virtual reality system of claim 19, wherein the sequential presentation of virtual images or parts of virtual images creates a perception of a motion picture, motion graphics, an animation, or combinations thereof.

23. The augmented reality, mixed reality, extended reality, enhanced reality, or virtual reality system of claim 19, wherein the sequential presentation of virtual images or parts of virtual images is over about 20 frames per second.

24. The augmented reality, mixed reality, extended reality, enhanced reality, or virtual reality system of claim 19, wherein the sequential presentation of virtual images or parts of virtual images occurs at a rate capable of allowing the wearer of the system to perceive combined virtual images or parts of virtual images in a seamless or mostly seamless motion picture or a stable virtual image.

25. The augmented reality, mixed reality, extended reality, enhanced reality, or virtual reality system of claim 19, wherein the system is capable of automatically determining an amount of frames per second for a video, and the automatic frames per second determination is dependent on video content, imagery content, or system application.

26. The augmented reality, mixed reality, extended reality, enhanced reality, or virtual reality system of claim 19, wherein the system is capable of stitching the virtual images or parts of virtual images together to create a perception of a combined image, a motion picture, motion graphics, an animation, or combinations thereof.

27. The augmented reality, mixed reality, extended reality, enhanced reality, or virtual reality system of claim 19, wherein the switchable or tunable micro lenses comprise conventional, Fresnel, or diffractive, and wherein the shape of the switchable or tunable micro lenses are spherical or aspherical.

28. The augmented reality, mixed reality, extended reality, enhanced reality, or virtual reality system of claim 19, wherein the switchable or tunable micro lenses comprise one or more of electrostatic, dielectrophoretic, electrowetting lenses, liquid crystals, polymer micro and nano-dispersed liquid crystals, or combinations thereof.

29. The augmented reality, mixed reality, extended reality, enhanced reality, or virtual reality system of claim 19, wherein the optical module is partially or sparsely populated with the display pixels.

30. The augmented reality, mixed reality, extended reality, enhanced reality, or virtual reality system of claim 19, wherein the system is capable of automatically determining a duty cycle of the system, the one or more switchable or tunable micro lenses, the one or more display pixels, or combinations thereof, depending on an amount of environmental ambient light, and wherein when the system is in a low-light environment a short duty cycle is applied, and wherein when the system is in a high-light or bright environment a longer duty cycle is applied.

31. The augmented reality, mixed reality, extended reality, enhanced reality, or virtual reality system of claim 19, wherein the system is capable of automatically determining a pulse timing or duration of the system, the one or more switchable or tunable micro lenses, the one or more display pixels, or combinations thereof, and wherein the pulse timing or duration is dependent on an amount of ambient light in the real world environment.

32. The augmented reality, mixed reality, extended reality, enhanced reality, or virtual reality system of claim 19, wherein the system is capable of automatically determining a duty cycle of the system based on ambient light conditions and monitoring ambient light conditions to modify the duty cycle based on the ambient light conditions.

33. The augmented reality, mixed reality, extended reality, enhanced reality, or virtual reality system of claim 19, wherein a duty cycle of the system is automatically computed and applied by the system to maintain a virtual image quantity or quality and see-through quantity or quality as an ambient light environment fluctuates or changes.

* * * * *